US 7,031,149 B2

(12) United States Patent
Dean et al.

(10) Patent No.: US 7,031,149 B2
(45) Date of Patent: Apr. 18, 2006

(54) SYSTEM FOR SECURING A COMPONENT WITHIN A CAGE

(75) Inventors: Ronald P. Dean, Fort Collins, CO (US); James R. Bullington, Athens, AL (US); Tung-Yuo Liao, Taipei Hsien (TW)

(73) Assignee: Hewlett-Packard Development Company, L.P., Houston, TX (US)

( * ) Notice: Subject to any disclaimer, the term of this patent is extended or adjusted under 35 U.S.C. 154(b) by 270 days.

(21) Appl. No.: 10/669,583

(22) Filed: Sep. 24, 2003

(65) Prior Publication Data

US 2005/0063151 A1 Mar. 24, 2005

(51) Int. Cl.
*G06F 1/16* (2006.01)
(52) U.S. Cl. ............... 361/685; 361/684; 361/747; 312/223.2
(58) Field of Classification Search ............... 361/683, 361/685, 724–727, 730–732, 729, 735, 747; 312/223.2, 223.3, 216, 218, 251.1, 333; 369/75.1, 369/77.1, 77.2; 248/220.31, 224.8, 60, 581, 248/609, 611; 360/137, 137 D, 97.01, 98.01
See application file for complete search history.

(56) References Cited

U.S. PATENT DOCUMENTS

| | | | |
|---|---|---|---|
| 6,040,980 A | 3/2000 | Johnson | |
| RE36,695 E | 5/2000 | Holt | |
| 6,139,213 A | 10/2000 | Osborne et al. | |
| 6,279,754 B1 | 8/2001 | Hoss et al. | |
| 6,292,359 B1 | 9/2001 | Boe | |
| 6,297,952 B1 * | 10/2001 | Liu et al. | 361/685 |
| 6,370,022 B1 * | 4/2002 | Hooper et al. | 361/685 |
| 6,373,694 B1 * | 4/2002 | Chang | 361/685 |
| 6,377,447 B1 | 4/2002 | Boe | |
| 6,377,449 B1 * | 4/2002 | Liao et al. | 361/685 |
| 6,445,663 B1 * | 9/2002 | Chen et al. | 720/652 |
| 6,456,489 B1 * | 9/2002 | Davis et al. | 361/684 |
| 6,543,866 B1 * | 4/2003 | Chen et al. | 312/223.2 |
| 6,628,514 B1 * | 9/2003 | Chen | 361/685 |
| 6,652,314 B1 * | 11/2003 | Tournadre | 439/536 |
| 6,728,109 B1 * | 4/2004 | Wu | 361/747 |
| 6,744,625 B1 * | 6/2004 | Syring et al. | 361/685 |
| 6,853,547 B1 * | 2/2005 | Williams et al. | 361/685 |
| 2002/0101713 A1 | 8/2002 | Band | |
| 2004/0125556 A1 * | 7/2004 | Chen et al. | 361/685 |

\* cited by examiner

*Primary Examiner*—Michael Datskovskiy

(57) ABSTRACT

In accordance with an embodiment of the present invention, an apparatus for securing a component to a computer chassis comprises a cage couplable to the computer chassis and operable to hold the component and a clamp couplable to the cage and operable to secure the component to the cage.

17 Claims, 7 Drawing Sheets

SYSTEM FOR SECURING A COMPONENT WITHIN A CAGE

TECHNICAL FIELD OF THE INVENTION

The present invention relates generally to the field of computers, and more particularly to a system for securing a component within a cage.

BACKGROUND OF THE INVENTION

Computer components, including media drives such as hard disk drives, optical disk drives, tape drives, floppy disk drives, and the like, are commonly attached to the chassis of a computer. For example, a conventional device for mounting a media drive to the computer chassis includes a drive cage. The drive cage is usually coupled to the chassis by screws or the like. The component is typically fastened to the cage by means of screws. Insertion and removal of screws to fasten the component to the cage is time-consuming and cumbersome. This process requires the use of external tools to mount the component into the cage. In order to fasten the component to the cage, the component has to be properly aligned with holes in the drive cage before inserting the screws. Furthermore, after the screws have been inserted, care must be taken to ensure that the screws are not too loose or too tight which may effect the alignment of the media drive.

SUMMARY OF THE INVENTION

In accordance with an embodiment of the present invention, an apparatus for securing a component to a computer chassis comprises a cage couplable to the computer chassis and operable to hold the component and a clamp couplable to the cage and operable to secure the component to the cage.

In accordance with another embodiment of the present invention, an apparatus for securing a component to a computer chassis comprises a cage couplable to the computer chassis and operable to hold the component and a clamp comprising a first side member couplable to a first transverse member of the cage and a second side member couplable to the first side member by a central member, the second side member couplable to a second transverse member of the cage opposite the first transverse member, the first side member, the second side member and the central member operable to secure the component to the cage.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF THE DRAWINGS

The preferred embodiment of the present invention and its advantages are best understood by referring to FIGS. 1 through 7 of the drawings, like numerals being used for like and corresponding parts of the various drawings.

The present invention will be described herein with reference to a component, such as a media drive. The teachings of the present invention may be used with respect to other types of components, such as, for example and not by way of limitation, a fan.

Figure 1:
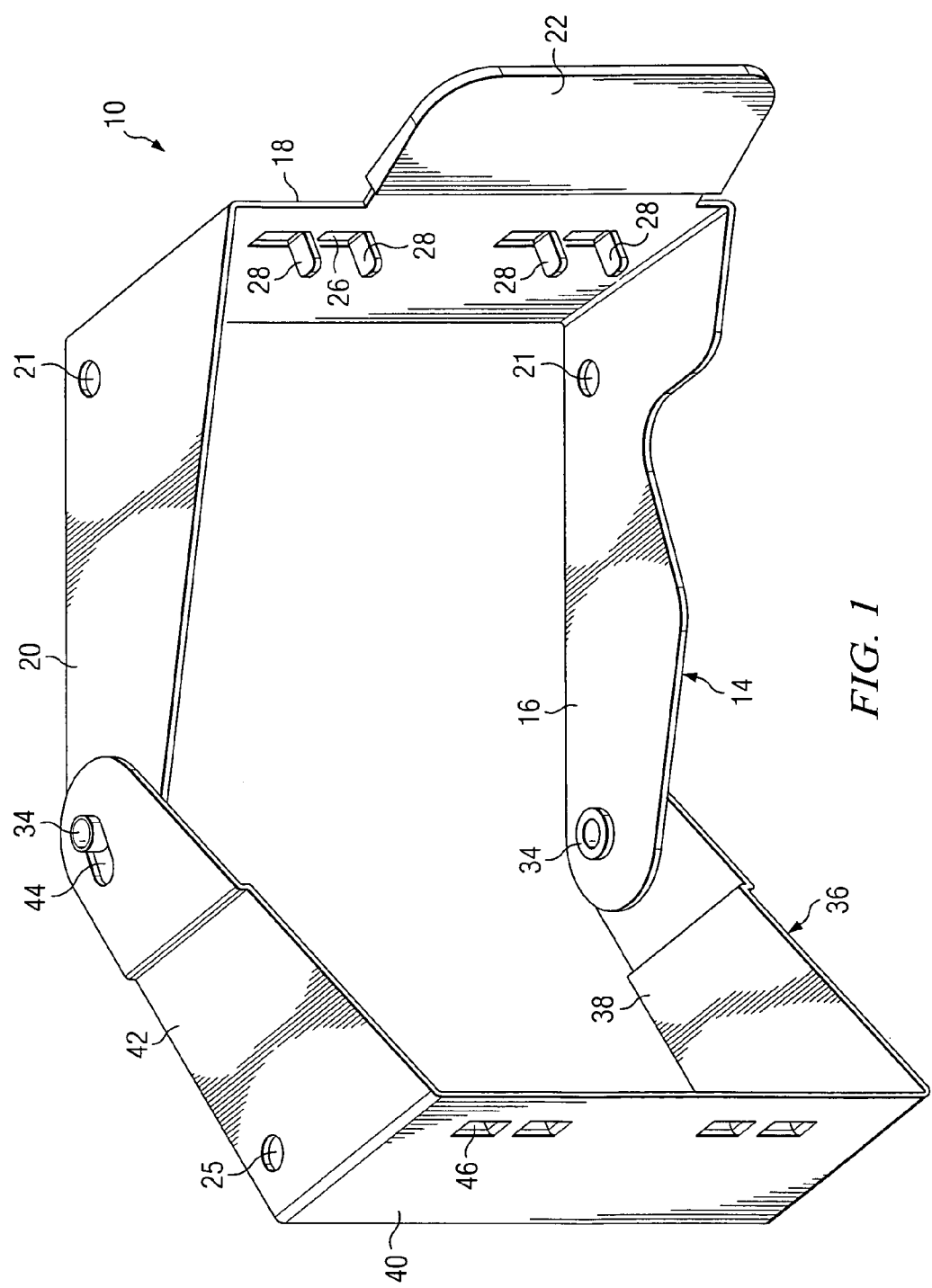
FIG. 1 is a perspective view showing a back of a media drive engaging mechanism in accordance with an embodiment of the present invention.
Figure 2:
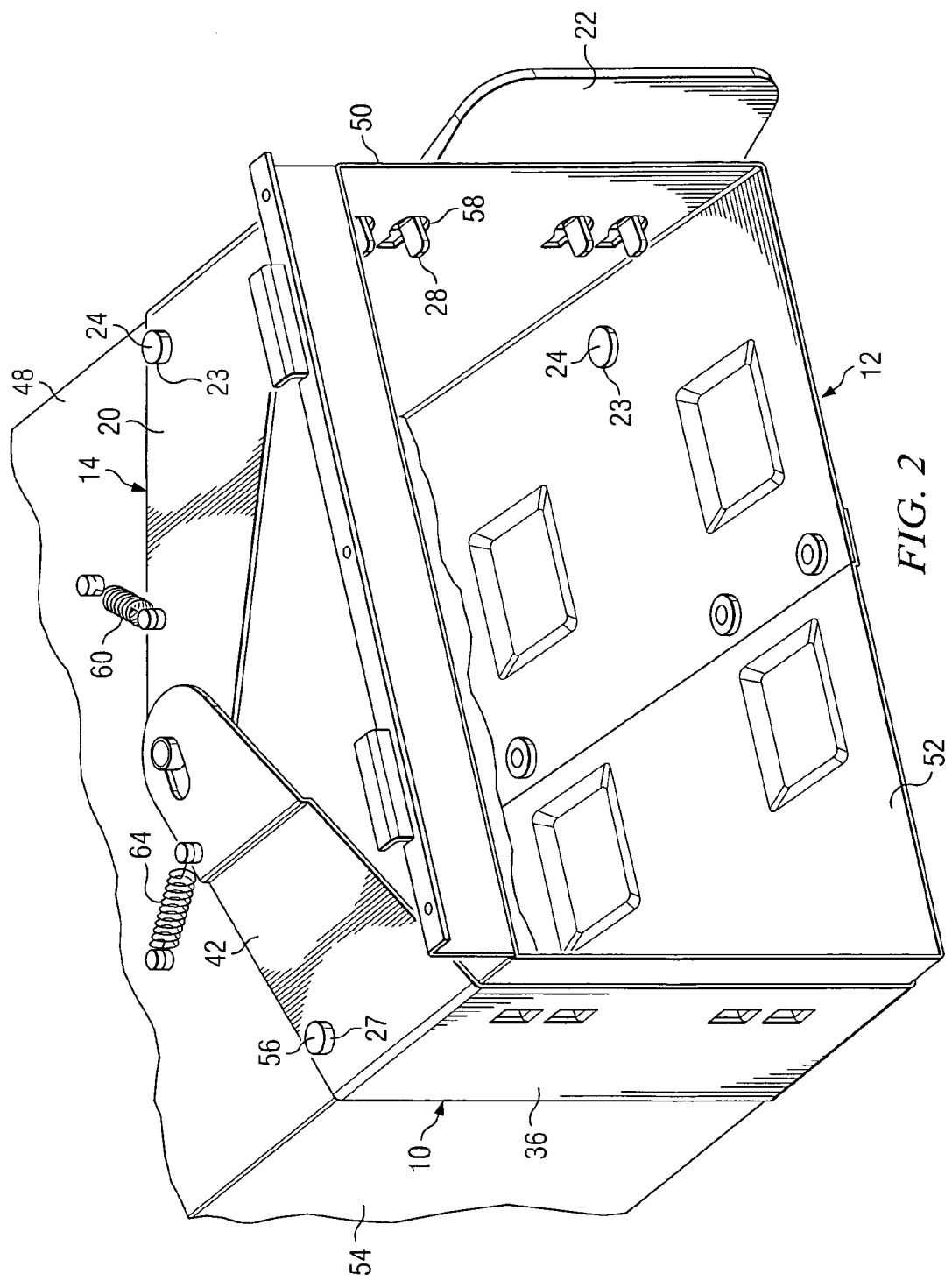
FIG. 2 is a perspective view showing a media drive engaging mechanism coupled to a drive cage in accordance with an embodiment of the present invention.

Referring to FIG. 1, which is a perspective view showing the back of a media drive engaging mechanism 10 in accordance with an embodiment of the present invention, engaging mechanism 10 is in the form of a clamp assembly and comprises a first clamp 14. First clamp 14 comprises two side members 16 and 20 coupled together by a central member 18 in a generally U-shaped configuration. First clamp 14 also comprises a handle 22 which may be used to move engaging mechanism 10 around one or more pivot points 24 as shown in FIG. 2. FIG. 2 is a perspective view showing media drive engaging mechanism 10 coupled to a drive cage 12 in accordance with an embodiment of the present invention. Handle 22 is coupled to central member 18. If desired, handle 22 may be an extension of central member 18. First clamp 14 also comprises at least one pin 28 for engaging with a corresponding mounting slot 30 in a media drive 32 as also shown in FIG. 3.

Figure 3:
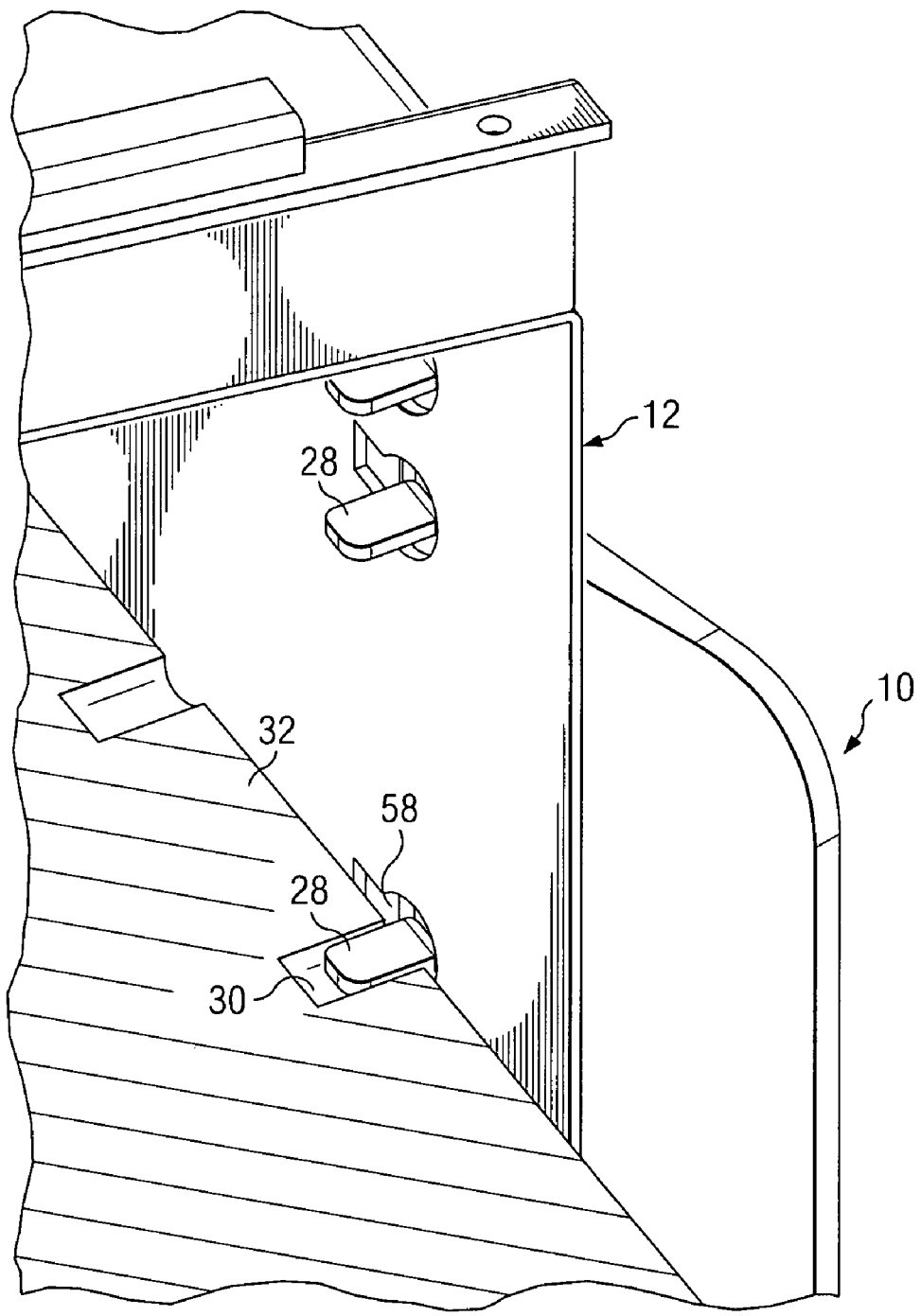
FIG. 3 is a perspective view showing an interface between a drive cage, a portion of a media drive and the media drive engaging mechanism in accordance with an embodiment of the present invention.

FIG. 3 is a perspective view showing an interface between drive cage 12, a portion of media drive 32 and media drive engaging mechanism 10 in accordance with an embodiment of the present invention. Pin(s) 28 are preferably provided on an inside surface of central member 18 (FIG. 1) and are preferably orthogonal to central member 18. If desired, pin(s) 28 may be at an angle other than ninety degrees to central member 18 to correspond with the orientation of mounting slot 30 in media drive 32 (FIG. 3). Media drive 32 may be any media drive now known or later developed, for example, a hard disk drive, an optical disk drive, a tape drive, a floppy disk drive, and the like. If desired, first clamp 14 may also comprise at least one clamp hole 26 (FIG. 1). Clamp hole(s) 26 are provided on central member 18 near pin(s) 28.

If desired, media drive engaging mechanism 10 may also comprise a second clamp 36. Second clamp 36 preferably comprises two side members 38 and 42 coupled together by a central member 40 in a generally U-shaped configuration. In the illustrated embodiment, first clamp 14 comprises two clamp-engaging members 34, each disposed near the free end of side member 16 and side member 20, respectively, and second clamp 36 comprises two clamp slots 44, each disposed near the free end of side member 38 and side member 42, respectively. First clamp 14 and second clamp 36 are pivotally coupled together by clamp-engaging members 34 disposed in clamp slots 44. The free end of side member 20 of first clamp 14 is coupled to the free end of side member 42 of second clamp 36, and the free end of side member 16 of first clamp 14 is coupled to the free end of side member 38 of second clamp 36. Each clamp-engaging member 34 passes through the respective clamp slot 44 to couple first clamp 14 and second clamp 36 together. If desired, in an alternative embodiment, the clamp-engaging members may be provided on the second clamp and the clamp slots may be provided on the first clamp. Alternatively, if desired, each of the clamps may comprise a clamp-engaging member and a clamp slot for coupling with a corresponding clamp slot and clamp-engaging member on the other clamp, respectively.

Second clamp 36 comprises at least one pin, similar to that shown as pin 28 in FIG. 3, for engaging with a corresponding mounting slot 30 in media drive 32. The pin(s) are preferably provided on an inside surface of central member 40 (FIG. 1) and are preferably orthogonal to central member 40. If desired, the pin(s) may be at an angle other than ninety degrees to central member 40 to correspond with the orientation of mounting slot 30 in media drive 32. If desired, second clamp 36 may also comprise at least one clamp hole 46. Clamp hole(s) 46 are provided on central member 40 near the pin(s) to allow the user to view media drive 32 in order to align mounting holes 30 with the pins if desired. Because of the manner in which first and second clamps 14 and 36 are coupled with each other, they may be pivoted around clamp-engaging members 34 and clamp-engaging members 34 may be moved along slots 44 to modify the pivot point.

Returning to FIG. 2, drive cage 12 comprises side members 50 and 54 coupled together by transverse members 48 and 52 in a rectangular configuration. Media drive engaging mechanism 10 is shown mounted on cage 12 in FIG. 2. Side members 20 and 16 each preferably comprise a hole 21 (FIG. 1) through which a fastener 23 (FIG. 2) may be inserted for coupling side members 20 and 16 of first clamp 14 to first and second transverse members 48 and 52 of cage 12, respectively, at pivot points 24. Side members 42 and 38 each preferably comprises a hole 25 (FIG. 1) through which a fastener 27 may be inserted for coupling side members 42 and 38 of second clamp 36 to first and second transverse members 48 and 52 of cage 12, respectively, at pivot points 56.

First side member 50 of cage 12 comprises a plurality of cage holes 58 with which pins 28 of first clamp 14 engage. The number of cage holes 58 in first side member 50 is at least equal to the number of pins 28 in first clamp 14. Second side member 54 preferably also comprises at least one cage hole, similar to that shown as cage hole 58 in FIG. 3, through which the pins of second clamp 36 may pass. The number of cage holes in second side member 54 is at least equal to the number of pins in second clamp 36.

Figure 4:
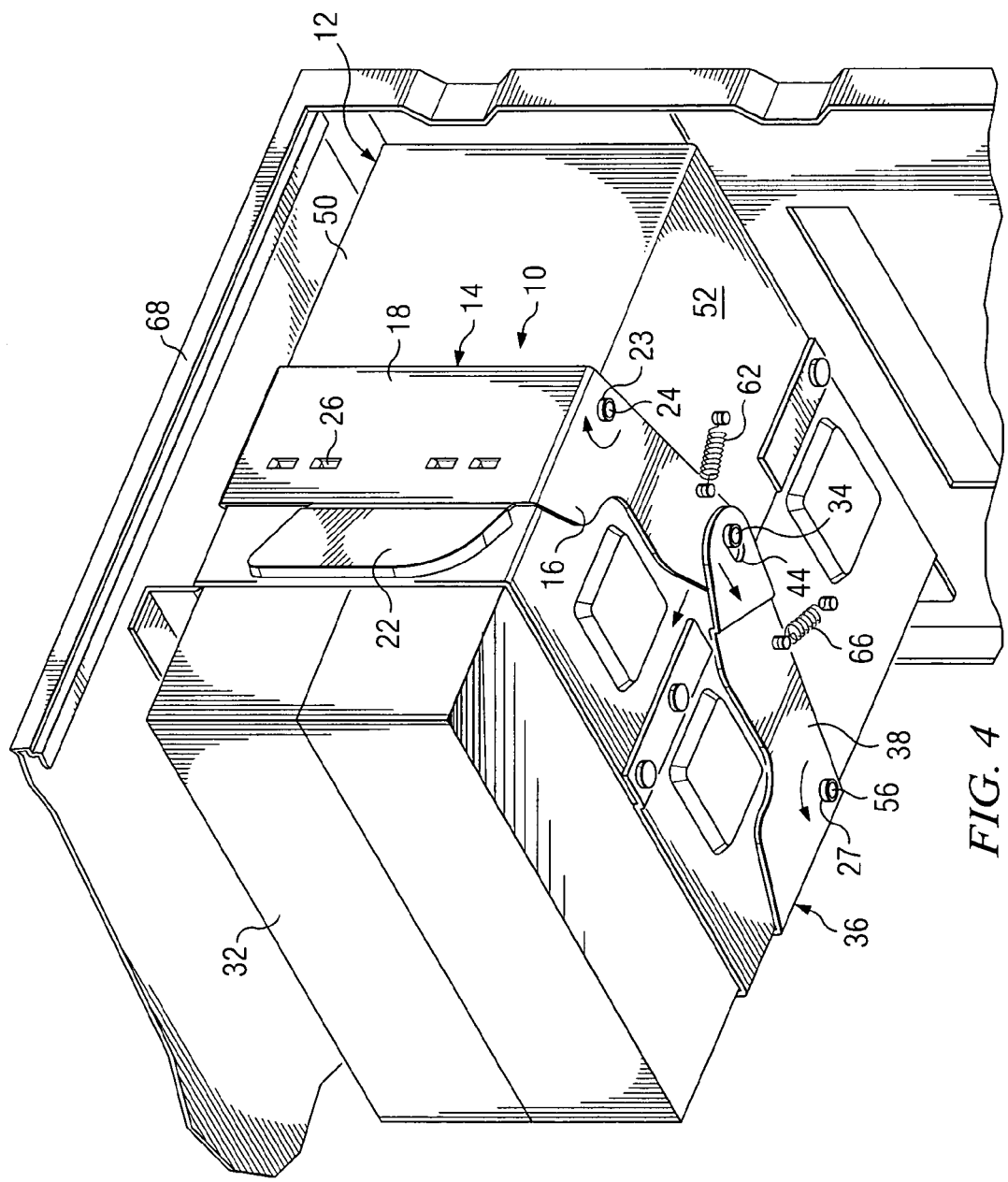
FIG. 4 is a perspective view showing a side and bottom of a drive cage with a media drive engaging mechanism in an engaged position in accordance with an embodiment of the present invention.

Preferably, a biasing element 60, such as a spring, is provided. One end of biasing element 60 is coupled to side member 20 of first clamp 14 and another end of biasing element 60 is coupled to first transverse member 48 of cage 12 to bias first clamp 14 toward an engaged or closed position. Referring to FIG. 4, which is a perspective view showing a side and the bottom of drive cage 12 with media drive engaging mechanism 10 in an engaged position, one end of a second biasing element 62 may be coupled to side member 16 of first clamp 14 and another end of second biasing element 62 may be coupled to second transverse member 52 of cage 12 to further bias first clamp 14 toward the engaged position. One end of a third biasing element 64 (FIG. 2) is coupled to side member 42 of second clamp 36 and another end of third biasing element 64 may be coupled to first transverse member 48 of cage 12 to bias second clamp 36 toward the engaged position. One end of a fourth biasing element 66 (FIG. 4) may be coupled to side member 38 of second clamp 36 and another end of fourth biasing element 66 may be coupled to second transverse member 52 of cage 12 to further bias second clamp 14 toward the engaged position. If desired, in an alternative embodiment, biasing elements may be provided to bias engaging mechanism 10 toward a disengaged or open position.

In the engaged position, engaging mechanism 10 secures media drive 32 within cage 12 (FIG. 4). In the engaged position, pins 28 of first clamp 14 pass through corresponding cage holes 58 in first side member 50 of cage 12 (FIG. 2) and engage with corresponding mounting slots 30 provided in media drive 32 (FIG. 3) to secure media drive 32 in cage 12. Preferably, in the engaged position, pins of second clamp 36 pass through corresponding cage holes in second side member 54 (FIG. 2) of cage 12 and engage with corresponding mounting slots provided in media drive 32 to better secure media drive 32 in cage 12. Media drive 32 is thus prevented from sliding out of cage 12.

In the engaged position as illustrated in FIG. 4, springs 62 and 66 are preferably in their normal unstretched position. In this position, due to a pre-load, springs 62 and 66 apply a small force on first clamp 14 and second clamp 36, respectively, thereby biasing them toward the closed position. In order to change engaging mechanism 10 to the disengaged position, a user may pull handle 22 outwardly in a direction away from cage 12. The outward motion of handle 22 causes side member 16 of first clamp 14 to pivot around pivot point 24 in a clockwise direction as indicated by the arrow (FIG. 4) around pivot point 24. This causes the free end of side member 16 coupled to side member 38 of second clamp 36 to move toward the back of cage 12 along slot 44 of second clamp 36. The motion of first clamp 14 also causes side member 38 of second clamp 36 to pivot around pivot point 56 in a counter-clockwise direction as indicated by the arrow (FIG. 4) around pivot point 56. This causes the pins of second clamp 36 to disengage from the cage holes in second side member 54 (FIG. 2) of cage 12. The outward motion of handle 22 causes pins 28 of first clamp 14 to disengage from cage holes 58 in first side member 50 of cage 12 thereby bringing engaging mechanism 10 to a disengaged position.

Figure 5:
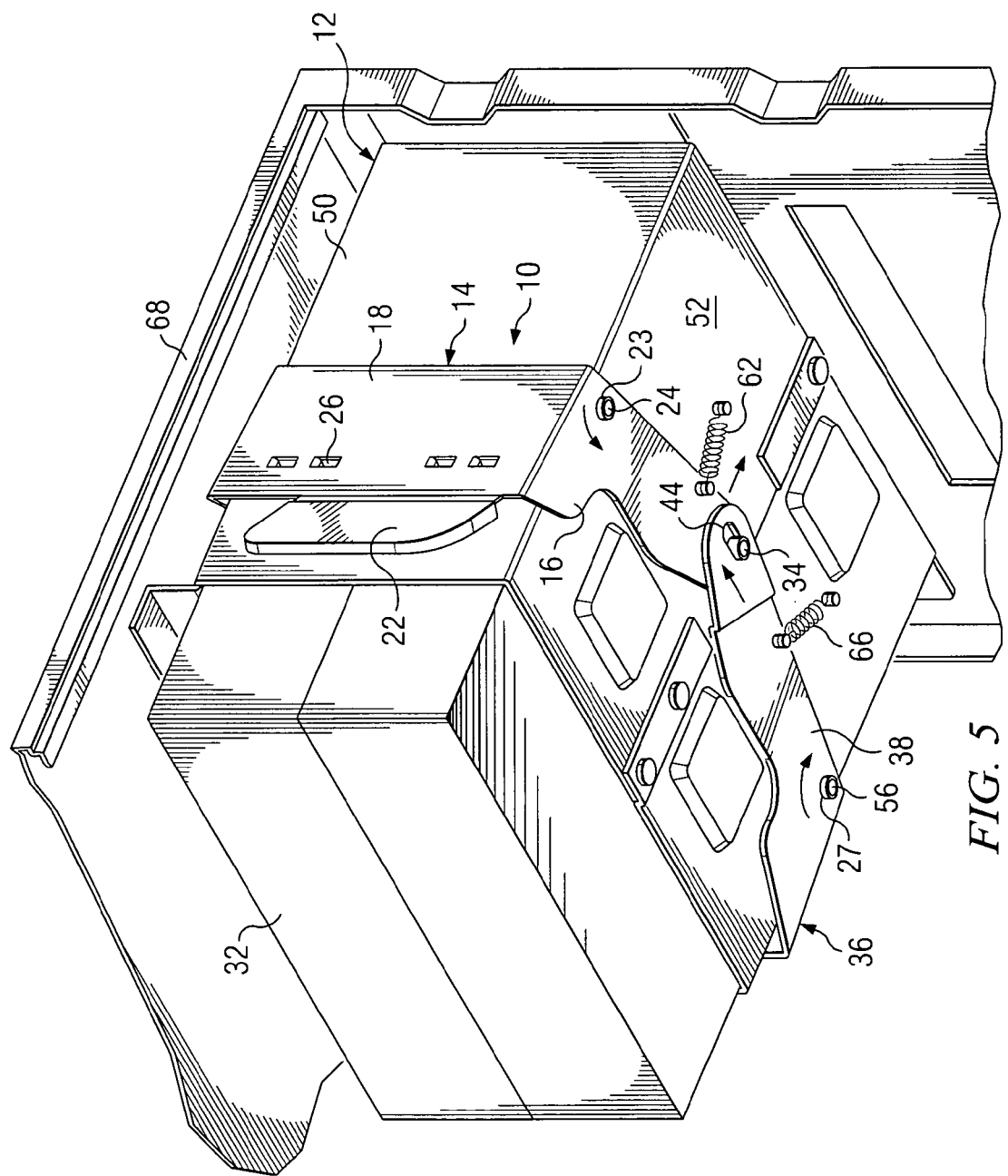
FIG. 5 is a perspective view showing a side and bottom of a drive cage with a media drive engaging mechanism in a disengaged position in accordance with an embodiment of the present invention.

FIG. 5 is a perspective view showing a side and bottom of drive cage 12 with media drive engaging mechanism 10 in a disengaged position. When engaging mechanism 10 is in the disengaged position, media drive 32 may be inserted into cage 12 and engaging mechanism 10 moved into the engaged position to secure media drive 32 inside cage 12. Alternatively, if media drive 32 is already inside cage 12, then after moving engaging mechanism 10 to the disengaged position, media drive 32 may be removed from cage 12. In the disengaged position, pins of the first and second clamps do not engage with mounting slots in media drive 32 thereby facilitating removal of media drive 32 from cage 12. In the disengaged position as illustrated in FIG. 5, springs 62 and 66 are preferably in an extended position and as such apply pressure on first clamp 14 and second clamp 36 respectively. Preferably, first and second clamps 14 and 36 move in unison.

In order to move engaging mechanism 10 to the engaged position (FIG. 4), a user may simply release handle 22. Release of handle 22 causes springs 62 and 66 to pull on first and second clamps 14 and 36 respectively. This causes side member 16 of first clamp 14 to pivot around pivot point 24 in a counter-clockwise direction as indicated by the arrow (FIG. 5) around pivot point 24. This also causes the free end of side member 16 coupled to side member 38 of second clamp 36 to move toward the front of cage 12 along slot 44 of second clamp 36. The motion of first clamp 14 also causes side member 38 of second clamp 36 to pivot around pivot point 56 in a clockwise direction as indicated by the arrow (FIG. 5) around pivot point 56. This causes the pins of second clamp 36 to pass through the cage holes in second side member 54 of cage 12. The motion of handle 22 causes pins 28 of first clamp 14 to pass through cage holes 58 in first side member 50 of cage 12 (FIG. 2) and with mounting slots 30 (FIG. 3) of drive 32, if drive 32 is inserted in cage 12. In the engaged position pins of the first and second clamps engage with mounting slots in media drive 32 thereby facilitating securing of media drive 32 in cage 12.

Figure 6:
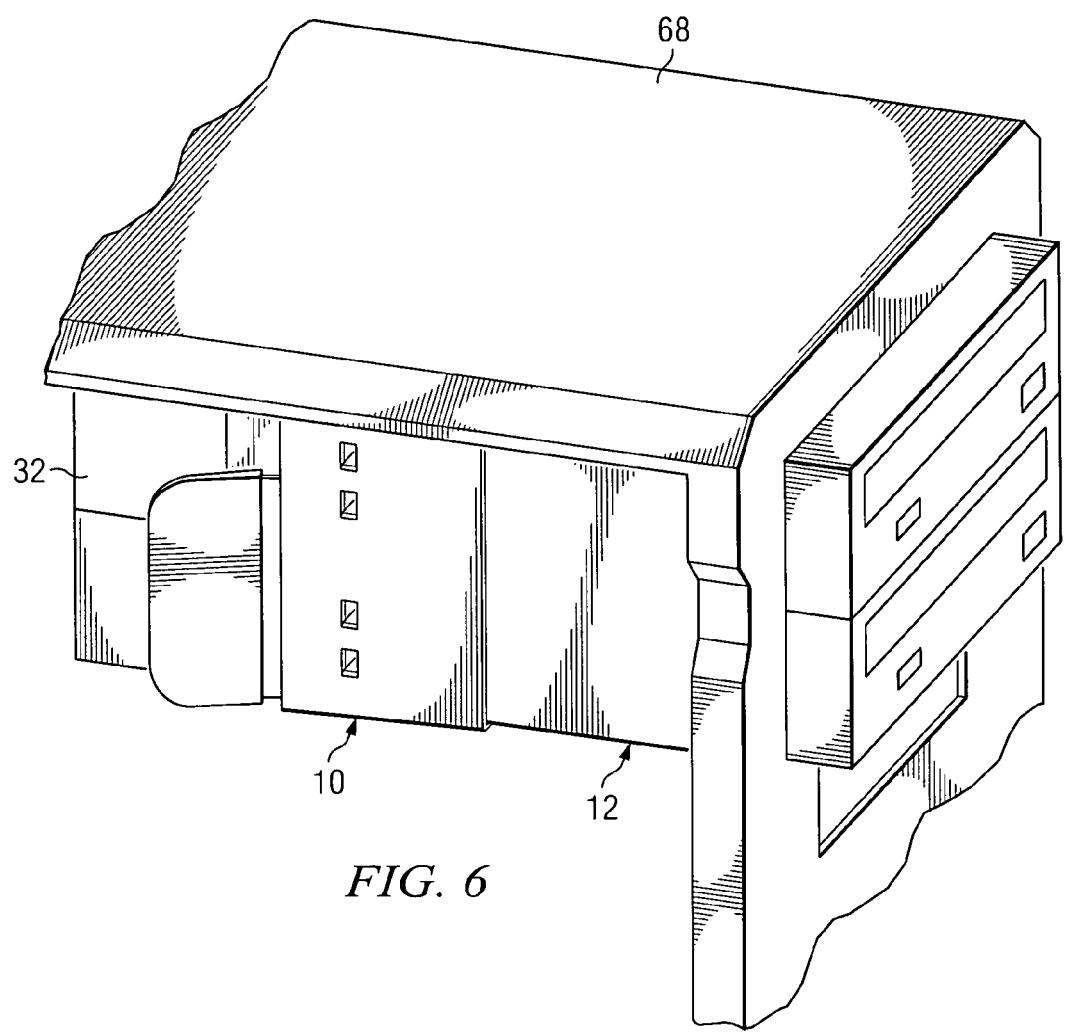
FIG. 6 is a perspective view showing a front and side of a computer chassis with a media drive secured within a cage and the cage secured to the computer chassis.

FIG. 6 is a perspective view showing the front and side of a computer chassis 68 with media drive 32 secured within cage 12 and cage 12 secured to computer chassis 68. Drive cage 12 is attached to computer chassis 68 by any mechanism now known or later developed.

Figure 7:
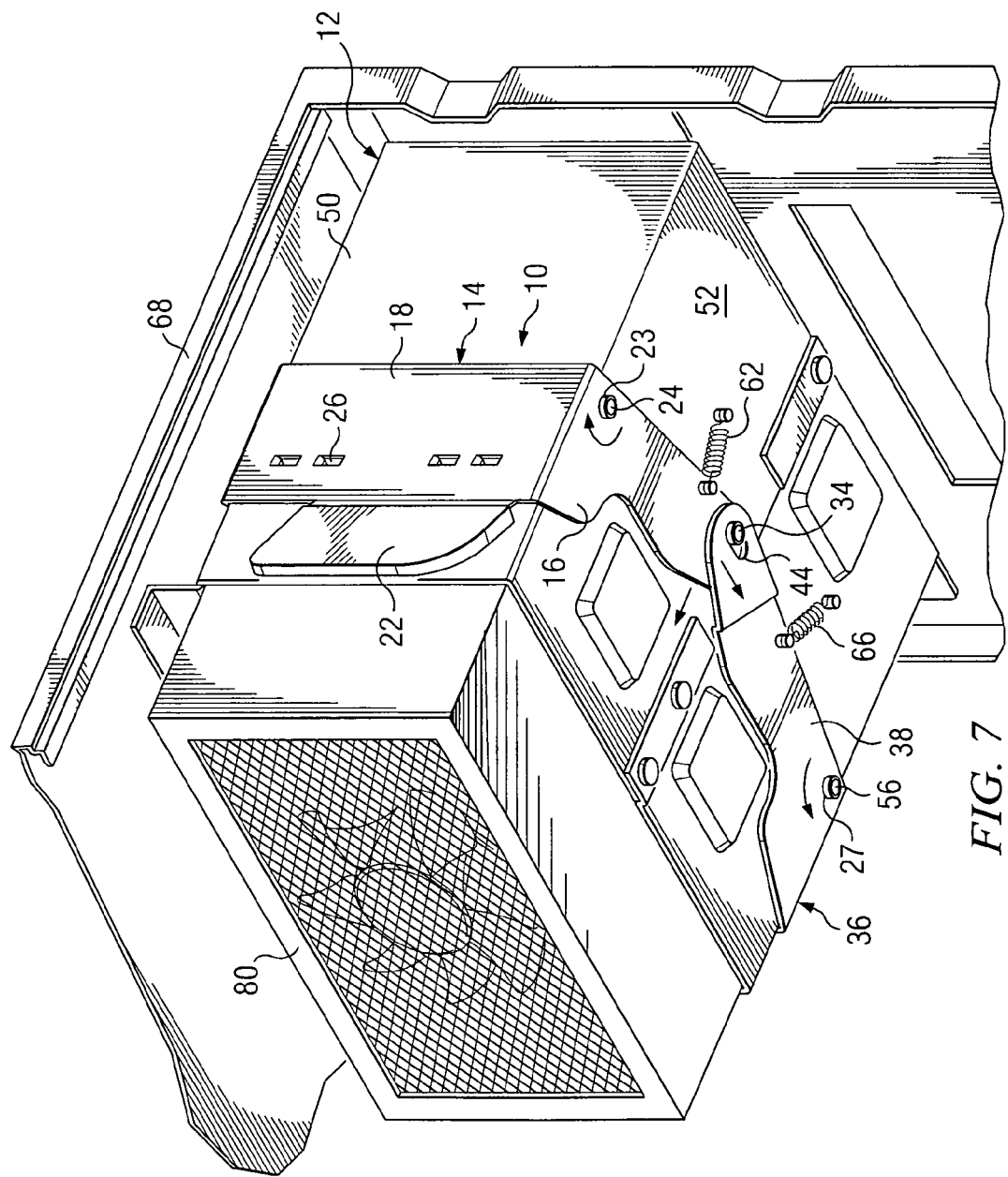
FIG. 7 is a perspective view illustrating the engaging mechanism of FIG. 4 in an engaged position securing a fan to a cage in accordance with the present invention.

FIG. 7 is a perspective view illustrating engaging mechanism 10 of FIG. 4 in an engaged position securing a fan 80 to cage 12 in accordance with the present invention. In FIG. 7, fan 80 is secured within cage 12, and cage 12 is secured to computer chassis 68.

Although the exemplary embodiment has been described herein with reference to two clamps, the invention is not so limited; alternative embodiments use only one clamp or more than two clamps.

A technical advantage of an exemplary embodiment of the present invention is that an external tool is not required to insert or remove a media drive from a computer chassis.

What is claimed is:

1. An apparatus for securing a component to a computer chassis, comprising:
   a cage couplable to said computer chassis and operable to hold said component;
   a clamp couplable to said cage and operable to secure said component to said cage; and
   at least one biasing element operable to bias said clamp to an engaged position in which said clamp secures said component to said cage.

2. The apparatus of claim 1, wherein said clamp is pivotally coupled to two opposing sides of said cage.

3. The apparatus of claim 1, wherein said at least one biasing element comprises a spring.

4. The apparatus of claim 1, wherein a first end of said at least one biasing element operable to bias said clamp to the engaged position is coupled to a transverse member of said cage and a second end of said at least one biasing element is coupled to a side of said clamp.

5. The apparatus of claim 1, wherein said at least one biasing element is operable to bias said clamp to a disengaged position in which said clamp is operable to facilitate removal of said component from said cage.

6. The apparatus of claim 1, wherein said at least one biasing element is operable to bias said clamp to a disengaged position in which said clamp is operable to facilitate insertion of said component into said cage.

7. The apparatus of claim 1, wherein said component comprises a media drive.

8. The apparatus of claim 1, wherein said component comprises a fan.

9. The apparatus of claim 1, wherein said component is selected from the group consisting of a hard disk drive, an optical disk drive, a tape drive, and a floppy disk drive.

10. The apparatus of claim 1, further comprising a second clamp coupled to said cage and operable to secure said component to said cage.

11. The apparatus of claim 10, wherein said second clamp is coupled to said first clamp.

12. The apparatus of claim 10, wherein said second clamp is pivotally coupled to two opposing sides of said cage.

13. The apparatus of claim 10, wherein said first and second clamps are operable to move in unison to secure said component to said cage.

14. The apparatus of claim 10, wherein said first and second clamps are operable to move in unison to release said component from said cage.

15. The apparatus of claim 2, further comprising a second clamp pivotally coupled to said two opposing sides, said second clamp being also coupled to said first clamp.

16. An apparatus for securing a component to a computer chassis, comprising:
   a cage couplable to said computer chassis and operable to hold said component; and
   a clamp, comprising:
      a first side member couplable to a first transverse member of said cage; and
      a second side member couplable to said first side member by a central member, said second side member couplable to a second transverse member of said cage opposite said first transverse member,
      said first side member, said second side member and said central member operable to secure said component to said cage.

17. The apparatus of claim 16, further comprising:
   a second clamp, comprising:
      a first side member couplable to said first transverse member of said cage; and
      a second side member couplable to said first side member of said second clamp by a central member of said second clamp, said second side member of said second clamp couplable to said second transverse member of said cage,
   said first side member, said second side member and said central member of said second clamp operable to secure said component to said cage.

* * * * *